US010320035B2

(12) United States Patent
Won et al.

(10) Patent No.: US 10,320,035 B2
(45) Date of Patent: Jun. 11, 2019

(54) BATTERY PACK

(71) Applicant: SAMSUNG SDI CO., LTD., Yongin-si, Gyeonggi-do (KR)

(72) Inventors: Hee-Youn Won, Suwon-si (KR); Dae-Yon Moon, Suwon-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 853 days.

(21) Appl. No.: 14/499,899

(22) Filed: Sep. 29, 2014

(65) Prior Publication Data
US 2015/0093603 A1 Apr. 2, 2015

Related U.S. Application Data

(60) Provisional application No. 61/884,434, filed on Sep. 30, 2013.

(51) Int. Cl.
*H01M 10/42* (2006.01)
*H01M 2/02* (2006.01)
(Continued)

(52) U.S. Cl.
CPC ....... *H01M 10/4257* (2013.01); *H01M 2/021* (2013.01); *H01M 10/486* (2013.01);
(Continued)

(58) Field of Classification Search
None
See application file for complete search history.

(56) References Cited

U.S. PATENT DOCUMENTS

2006/0068275 A1   3/2006 Chung et al.
2006/0269831 A1   11/2006 Kim
(Continued)

FOREIGN PATENT DOCUMENTS

EP   2405508 A1   1/2012
EP   2 515 358 A1   10/2012
(Continued)

OTHER PUBLICATIONS

Search Report dated Jan. 26, 2015 in corresponding European Patent Application No. 14187187.1.
(Continued)

*Primary Examiner* — Amanda J Barrow
(74) *Attorney, Agent, or Firm* — Lee & Morse, P.C.

(57) ABSTRACT

A battery pack includes a pouch, an electrode assembly in the pouch, an electrode lead, the electrode lead being electrically coupled to the electrode assembly and extending from a sealing portion of the pouch, the sealing portion having a first thickness in a first region corresponding to the electrode lead and a second thickness in a second region adjacent to the electrode lead, the second thickness being less than the first thickness, and a protecting circuit module, the protecting circuit module including a substrate, a temperature control portion, and a connecting tab, the substrate having a first surface mounted on the first region, the first surface of the substrate being spaced apart from the second region, the connecting tab coupling the temperature control portion to the substrate, the connecting tab being configured such that a first surface of the temperature control portion contacts the second region of the sealing portion.

13 Claims, 3 Drawing Sheets

(51) Int. Cl.
*H01M 10/48* (2006.01)
*H01M 2/06* (2006.01)
*H01M 10/44* (2006.01)

(52) U.S. Cl.
CPC ............ *H01M 2/06* (2013.01); *H01M 10/443* (2013.01); *H01M 2200/10* (2013.01); *H01M 2220/30* (2013.01)

(56) References Cited

U.S. PATENT DOCUMENTS

| | | | | |
|---|---|---|---|---|
| 2011/0123838 | A1* | 5/2011 | Lee | H01M 2/0207 429/7 |
| 2011/0250475 | A1* | 10/2011 | Yamamoto | H01M 2/0277 429/7 |
| 2012/0009443 | A1* | 1/2012 | Baek | H01M 2/0404 429/7 |
| 2012/0009467 | A1* | 1/2012 | Park | H01M 2/0212 429/178 |
| 2013/0089762 | A1 | 4/2013 | Hong | |
| 2013/0149562 | A1 | 6/2013 | Lee et al. | |
| 2013/0171508 | A1 | 7/2013 | Kim | |

FOREIGN PATENT DOCUMENTS

| | | | | |
|---|---|---|---|---|
| GB | 2379553 A | 3/2003 | | |
| JP | 2002-334685 | * 11/2002 | | H01M 2/04 |
| KR | 10-2006-0112740 A | 11/2006 | | |
| KR | 10-2013-0038142 A | 4/2013 | | |
| KR | 2013-0048759 A | 5/2013 | | |

OTHER PUBLICATIONS

European Examination Report dated Apr. 11, 2016 in Corresponding European Patent Application No. 14187187.1.

* cited by examiner

BATTERY PACK

CROSS-REFERENCE TO RELATED APPLICATION

The present application claims priority under 35 U.S.C. § 119 to U.S. Provisional Application No. 61/884,434, filed on Sep. 30, 2013, and entitled: "Battery Pack," which is incorporated herein by reference in its entirety.

BACKGROUND

1. Field

Embodiments relate to a battery pack.

2. Description of the Related Art

Secondary batteries refer to rechargeable batteries. Secondary batteries are widely used in fields of electronic devices such as cellular phones, notebook computers, and camcorders. Among various kinds of secondary batteries, a lithium secondary battery has a high operation voltage and a high energy density per weight, and hence has been widely used.

SUMMARY

Embodiments are directed to a battery pack, including a pouch, an electrode assembly in the pouch, an electrode lead, the electrode lead being electrically coupled to the electrode assembly and extending from a sealing portion of the pouch, the sealing portion having a first thickness in a first region corresponding to the electrode lead and a second thickness in a second region adjacent to the electrode lead, the second thickness being less than the first thickness, and a protecting circuit module, the protecting circuit module including a substrate, a temperature control portion, and a connecting tab, the substrate having a first surface mounted on the first region, the first surface of the substrate being spaced apart from the second region, the connecting tab coupling the temperature control portion to the substrate, the connecting tab being configured such that a first surface of the temperature control portion contacts the second region of the sealing portion.

The temperature control portion may include an extending portion that provides an electrical connection to a body of the temperature control portion, the extending portion extending straight out from a side of the body of the temperature control portion and being electrically connected to the connecting tab.

The extending portion may be spaced apart from the first surface of the temperature control portion in a thickness direction of the sealing portion.

The connecting tab may include a first connecting portion electrically connected to the extending portion, a second connecting portion electrically connected to the substrate of the protecting circuit module, and a bent portion between the first and second connecting portions.

The first connecting portion may be spaced apart from the first surface of the temperature control portion in a thickness direction of the sealing portion.

The first connecting portion may be spaced apart from the second region of the sealing portion in a thickness direction of the sealing portion.

The first connecting portion may have a quadrangular shape, and the bent portion and the second connecting portion may extend from at least one side of the first connecting portion.

The bent portion may offset the first connecting portion from the second connecting portion in a thickness direction of the sealing portion.

The first connecting portion may be welded to the extending portion.

The substrate of the protecting circuit module may include a recess in a side thereof, the recess accommodating the temperature control portion.

The temperature control portion may include a first extending portion extending from a first side, and a second extending portion extending from a second side, an overall length of the temperature control portion including the first a td second extending portions being less than a length of the recess.

Respective connecting tabs may be provided at the first and second sides of the temperature control portion, the connecting tabs extending between the respective extending portions and edges of the recess.

The recess may expose the second region of the sealing portion, the temperature control portion being disposed on the second region in the recess.

The first surface of the temperature control portion may be spaced apart from the first surface of the substrate by a first distance in a thickness direction of the sealing portion, the first distance being equal to a difference between heights of the first and second regions of the sealing portion.

BRIEF DESCRIPTION OF THE DRAWINGS

Features will become apparent to those of skill in the art by describing in detail example embodiments with reference to the attached drawings in which.

DETAILED DESCRIPTION

Figure 1:
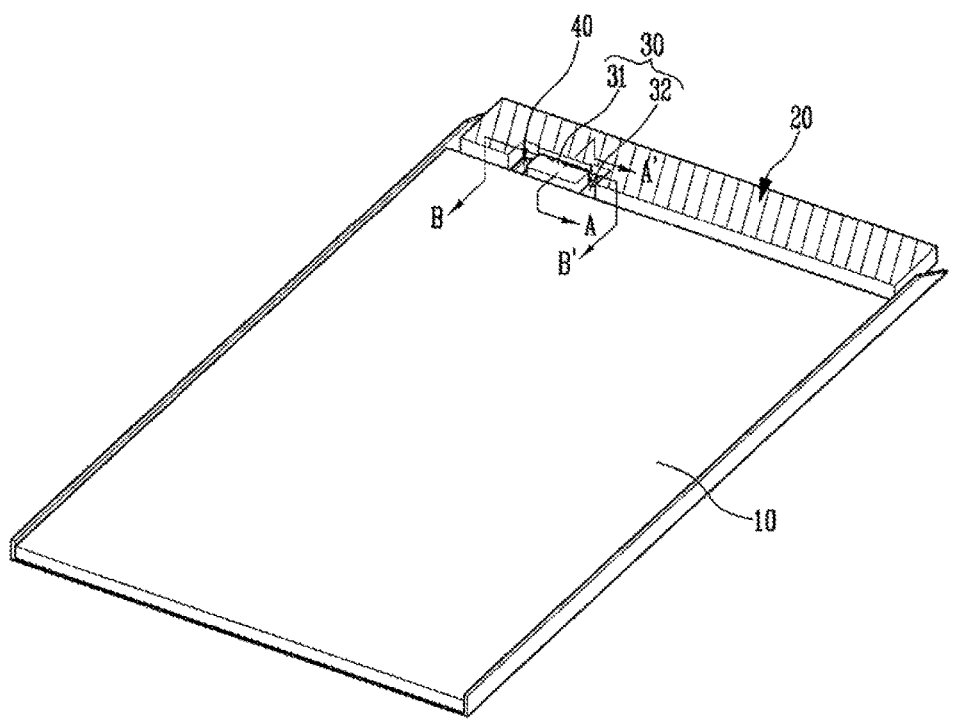
FIG. 1 illustrates an assembled perspective view of a battery pack according to an example embodiment.

Example embodiments will now be described more fully hereinafter with reference to the accompanying drawings, however, they may be embodied in different forms and should not be construed as limited to the embodiments set forth herein. Rather, these embodiments are provided so that this disclosure will be thorough and complete, and will hilly convey example implementations to those skilled in the art. In the drawing figures, the dimensions of layers and regions may be exaggerated for clarity of illustration. Like reference numerals refer to like elements throughout.

It will be understood that when an element is referred to as being "between" two elements, it can be the only element between the two elements, or one or more intervening elements may also be present. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween.

Figure 2:
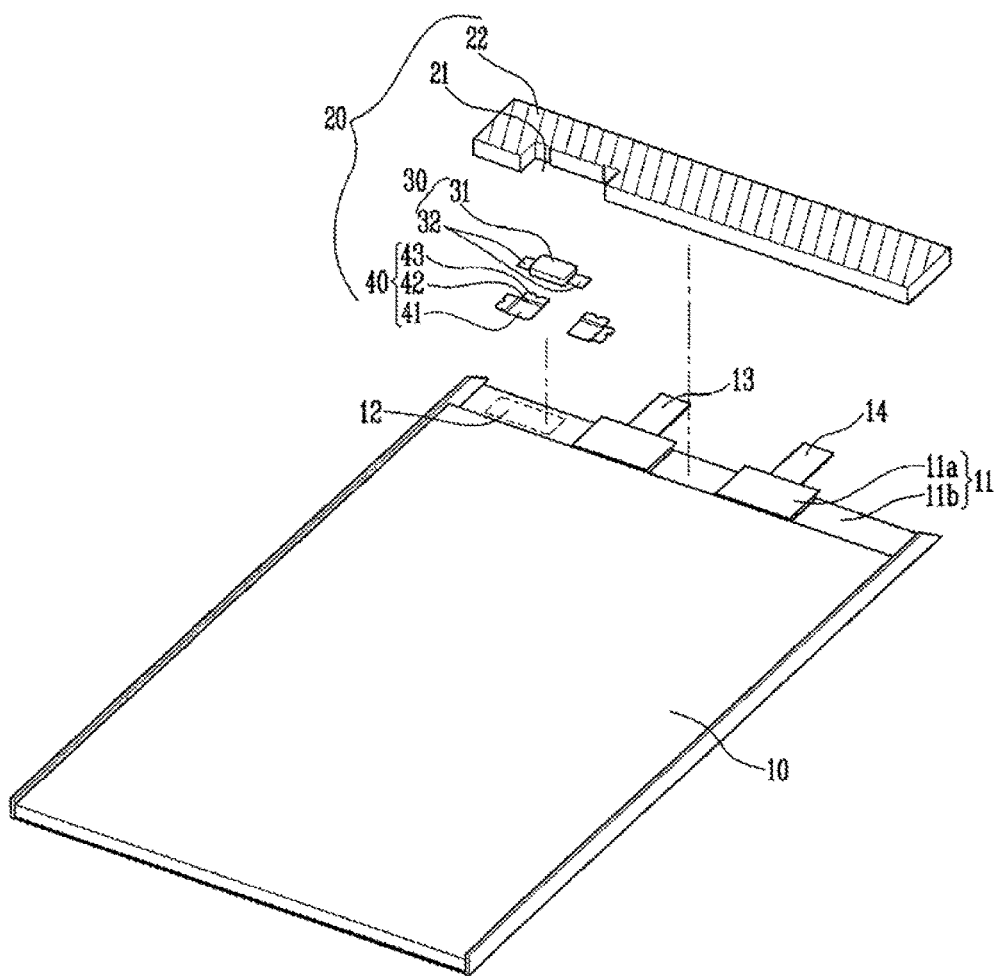
FIG. 2 illustrates an exploded perspective view of the battery pack of FIG. 1.

FIG. 1 illustrates an assembled perspective view of a battery pack according to an example embodiment. FIG. 2 illustrates an exploded perspective view of the battery pack of FIG. 1.

Referring to FIGS. 1 and 2, the battery pack according to the present example embodiment includes an electrode assembly (not shown), a case 10 configured to accommodate the electrode assembly therein, and a protecting circuit module (PCM) 20 provided with a temperature control portion 30.

The PCM 20 may include a substrate 22 having a groove portion 21 is formed in one area thereof. The groove portion 21 is an area in which the temperature control portion 30 is positioned. The PCM 20 and the temperature control portion 30 are connected by connecting tabs 40.

One or more electrode leads 13 and 14 may be formed to protrude from the electrode assembly. The electrode assembly is accommodated in the case 10 so that portions of the electrode leads 13 and 14 are exposed to the outside of the case 10. A sealing portion 11 is formed along an edge portion at the side where the electrode leads 13 and 14 are extracted in the case 10. The PCM 20 is connected to the electrode leads 13 and 14. The PCM 20 is mounted on an outer surface of the sealing portion 11 of the case 10.

According to the present example embodiment, the sealing portion 11 includes as first area 11a in which the electrode leads 13 and 14 are positioned, and a second area 11b that is an area of the sealing portion 11 excepting the first area 11a. The sealing portion 11 is formed so that the thickness of the first area 11a is different from that of the second area 11b. The thickness of the first area 11a is thicker than the thickness of the second area 11b due to the thickness of the electrode lead 13 or 14. For example, when the thickness of the first area 11a is 0.9 mm and the thickness of the second area 11b is 0.4 mm, the difference in thickness between the first and second areas 11a and 11b may be 0.5 mm. An insulating tape (not shown) may be further formed on an outer surface of the electrode lead 13 or 14 positioned at the sealing portion 11. Here, the thickness of the insulating tape is not considered.

The connecting tab 40 includes a first connecting portion 41 connected to the temperature control portion 30, a second connecting portion 43 connected to the PCM 20, and a bent portion 42 configured to connect the first and second connecting portions 41 and 43 with a step. In present example embodiment, the first connecting portion 41 of the connecting tab 40 is formed at a position lower than that of the second connecting portion 43. Thus, the first and second connecting portions 41 and 43 may be formed to be stepped by the height of the bent portion 42. The first and second connecting portions 41 and 43 may be formed in parallel to each other.

According to the present example embodiment, the temperature control portion 30 includes a body portion 31 configured to sense heat of the battery cell, and further includes extending portions 32 respectively extended from areas of sides, e.g., opposite sides, of the body portion 31. The extending portion 32 of the temperature control portion 30 is mounted and connected to an upper surface of the first connecting portion 41 of the connecting tab 40. The second connecting portion 43 of the connecting tab 40 is connected to a lower surface of the PCM 20. The first connecting portion 41 and the extending portion 32 may be connected through welding, and the second connecting portion 43 and the PCM 20 may be connected through welding.

According to the present example embodiment, the PCM 20 and the temperature control portion 30 connected thereto are mounted on the sealing portion 11. The lower surface of the PCM 20 is mounted so as to be in contact with the first area 11a of the sealing portion 11, and the temperature control portion 30 is mounted so as to be in contact with the second area 11b of the sealing portion 11. The temperature control portion 30 is mounted on a mounting portion 12 for the temperature control portion 30, formed in one area of the second area 11b. As such, the gap between the second area 11b of the sealing portion 11 and the temperature control portion 30 may be minimized by the step difference between the first and second connecting portions 41 and 43, which is formed by the bent portion 42 of the connecting tab 40. Accordingly, the heat sensing function of the temperature control portion 30 may be improved, so that the safety of the battery pack may be improved.

Hereinafter, a battery pack having a pouch-type case and an electrode assembly accommodated therein according to an example embodiment will be described.

According to the present example embodiment, the case 10 is formed as a pouch-type case. The pouch-type case may be formed with a plurality of layers including a metal layer. The case 10 is sealed after an electrode assembly is accommodated in the case 10. The sealing portion 11 of the case 10 may be formed through thermal fusion, and an inner surface of the pouch case may be made of a thermal adhesive resin for the purpose of sealing.

The electrode assembly accommodated in the case may be formed by winding a first electrode plate, a second electrode plate, and a separator interposed between the electrode plates. In another implementation, the electrode assembly may be formed by stacking the first electrode plate, the second electrode plate, and the separator interposed therebetween.

A first electrode tab may be connected to the first electrode plate to protrude to an upper end portion of the electrode assembly, and the second electrode tab may be connected to the second electrode plate to protrude to the upper end portion of the electrode assembly. In the electrode assembly, the first and second electrode tabs may be spaced apart from each other by a predetermined distance to be electrically insulated from each other.

A lamination tape may be wound around a portion at which the first or second electrode tab is extracted from the electrode assembly. The lamination tape may block heat generated in the first or second electrode tab. In addition, the lamination tape may allow the electrode assembly not to be compressed by an edge of the first or second electrode tab.

According to the present example embodiment, the first and second electrode tabs are respectively connected to the first and second electrode leads 13 and 14. Portions of the first and second electrode leads 13 and 14 are exposed to the outside of the case 10, and the first and second electrode leads 13 and 14 are accommodated in the case 10. An insulating tape (not shown) may be adhered to the first or second electrode lead 13 or 14 contacted with the sealing portion 11 of the case 10. The insulating tape may be formed to prevent a short circuit between the first or second electrode lead 13 or 14 and the case 10.

Figure 3:
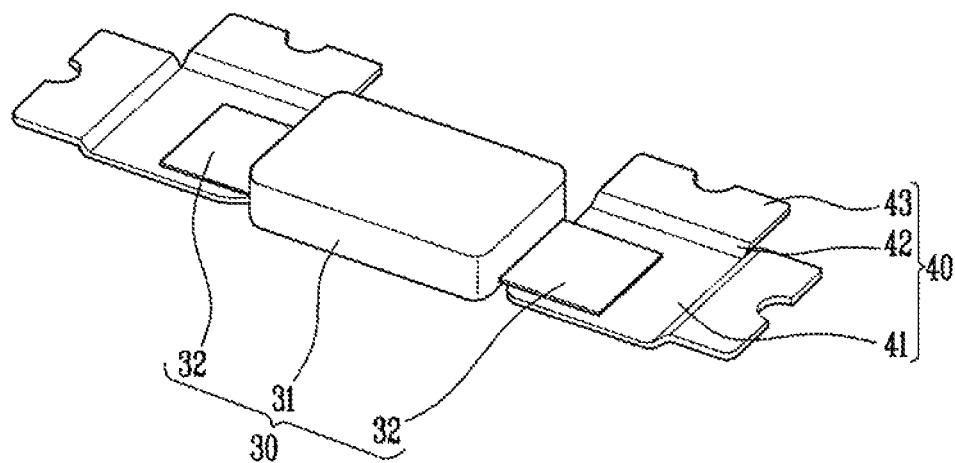
FIG. 3 illustrates a perspective view showing a temperature control portion and connecting tabs according to an example embodiment.

FIG. 3 illustrates a perspective view showing the temperature control portion and the connecting tabs according to an example embodiment.

In the example embodiment shown in FIG. 3, the temperature control portion 30 includes a body portion 31, and extending portions 32 respectively extended from areas of sides of the body portion 31. According to the present example embodiment, the extending portion 32 is not extended from a lower portion of the side of the body portion 31, but is extended from an area of the middle of the body portion 31. Thus, the extending portion 32 is formed to be spaced apart from the lower surface of the body portion 31 at a predetermined distance.

According to the present example embodiment, the connecting tabs 40 are components which connect the PCM 20 (see FIG. 1) and the temperature control portion 30. Each connecting tab 40 includes a first connecting portion 41 connected to the temperature control portion 30, a second connecting portion 43 connected to the PCM 20, and a bent portion 42 configured to connect the first and second connecting portions 41 and 43 to be stepped. The bent portion 42 is bent at a predetermined angle in the direction upward the outside of the first connecting portion 41. The first and second connecting portions 41 and 43 may be formed in parallel with each other with the first connecting portion 41 being formed at a position lower than that of the second connecting portion 43.

The first connecting portion 41 of the connecting tab 40 may be formed in a quadrangular shape. The bent portion 42 and the second connecting portion 43 may be formed to extend from at least one side of the first connecting portion 41, e.g., two sides of the first connecting portion 41 in the present example embodiment. The connecting tab 40 may be formed in another shape in which the first and second connecting portions 41 and 43 are formed stepped to connect the PCM 20 and the temperature control portion 30.

According to the present example embodiment, the extending portion 32 of the temperature control unit 30 is connected to an upper surface of the first connecting portion 41 of the connecting tab 40 when being connected to the connecting tab 40. The extending portion 32 of the temperature control portion 30 is extended from one area of the side of the body portion 31, spaced apart from the lower surface of the body portion 31, and the lower surface of the body portion 31 of the temperature control portion 30 is positioned lower than the first connecting portion 41 of the connecting tab 40.

Figure 4:
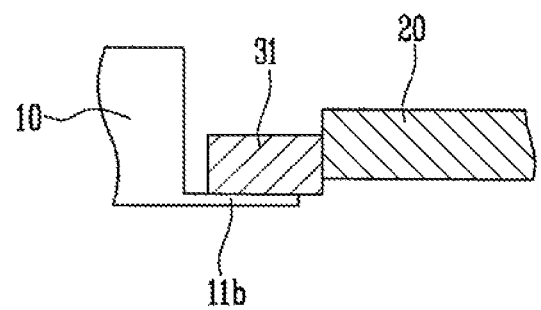
FIG. 4 illustrates a sectional view taken along line A-A' of FIG. 1.
Figure 5:
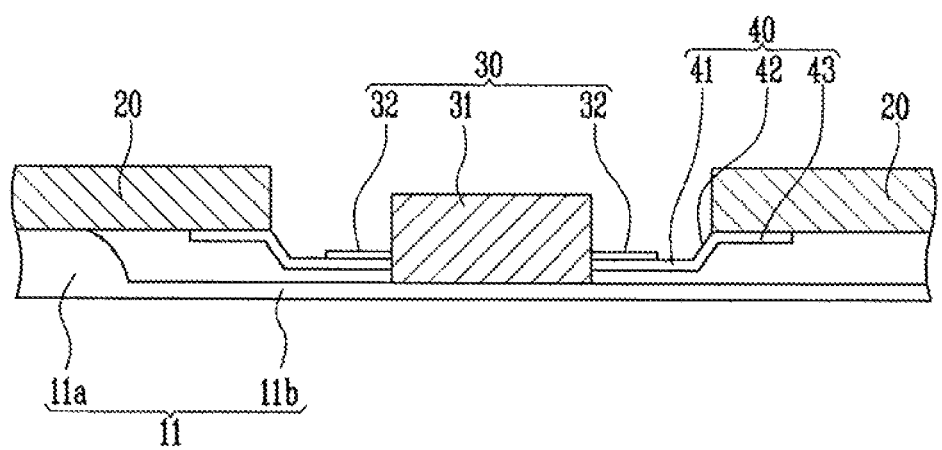
FIG. 5 illustrates a sectional view taken along line B-B' of FIG. 1.

FIG. 4 illustrates a sectional view taken along line A-A' of FIG. 1. FIG. 5 illustrates a sectional view taken along line B-B' of FIG. 1.

Referring to FIGS. 4 and 5, the PCM 20 and the temperature control portion 30 connected to the PCM 20 are mounted on the sealing portion 11 of the case 10. The PCM 20 is mounted while being contacted with the first area 11a of the sealing portion 11, and the temperature control portion 30 is mounted while being contacted with the second area 11b of the sealing portion 11.

For reference, a general connecting tab that connects a PCM and a temperature control portion has a flat shape and, as such, the temperature control portion is positioned to be spaced apart from the second area of the sealing portion pouch by a difference in thickness between the first area of the sealing portion in which the electrode lead is positioned) and the second area. Therefore, the temperature control portion may have difficulty in exactly sensing heat generated in the battery cell.

According to the present example embodiment, the bent portion 42 is formed in the connecting tab 40, so that the first connecting portion 41 connected to the extending portion 32 of the temperature control portion 30 and the second connecting portion 43 connected to the lower surface of the PCM 20 are formed to have a step difference. The bent portion 42 connects the first and second connecting portions 41 and 43 so that the first connecting portion 41 is formed at a position lower than that of the second connecting portion 43. The extending portion 32 of the temperature control portion 30 is connected to the first connecting portion 41 while being mounted on an upper surface of the first connecting portion 41.

The state in which the PCM 20 and the temperature control portion 30 are connected by the connecting tabs 40 will now be described. The PCM 20 is mounted on the first area 11a of the sealing portion 11, and the body portion 31 of the temperature control portion 30 is mounted on the second area 11b of the sealing portion 11. Thus, the bent portion 42 of the connecting tab 40 compensates for the height by the difference in thickness between the first and second areas 11a and 11b of the sealing portion 11 to minimize the gap between the body portion 31 of the temperature control portion 30 and the second area 11b of the sealing portion 11.

The lower surface of the body portion 31 of the temperature control portion 30 is positioned lower than the first connecting portion 41 of the connecting tab 40. The height of the bent portion 42 of the connecting tab 40 may be formed lower than the difference in thickness between the first and second areas 11a and 11b of the sealing portion 11. In this case, the lower surface of the first connecting portion 41 of the connecting tab 40 is formed to be spaced apart from the second area 11b of the sealing portion 11 at a predetermined distance. As such, the bent portion 42 is formed in the connecting tab which connects the temperature control portion 30 and the PCM 20 to minimize the gap between the temperature control portion and the sealing portion 11 of the case 10. Accordingly, it may be possible to more exactly sense the heat generated in the battery cell, which may improve the safety of the battery pack.

By way of summation and review, a lithium secondary battery may be manufactured in several types, e.g., a cylinder type, a can type, a pouch type, etc. A pouch-type secondary battery may be sealed in a state in which an electrode assembly is inserted into a pouch, and an electrode lead connected to an electrode tab of the electrode assembly is connected to a protecting circuit module (PCM).

As described above, embodiments relate to a battery pack that may provide improved safety. Embodiments may provide a battery pack in which a bending portion is loomed in a connecting tab that connects a temperature control portion and a protecting circuit module (PCM), which may minimize a gap between the temperature control portion and a sealing portion of a case and, thus, may allow the temperature control portion to more exactly sense heat generated in a battery cell. Accordingly, it may be possible to improve the safety of the battery pack.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the invention as set forth in the following claims.

What is claimed is:

1. A battery pack, comprising:
a pouch;
an electrode assembly in the pouch;
an electrode lead, the electrode lead being electrically coupled to the electrode assembly and extending from a sealing portion of the pouch, the sealing portion having a first thickness in a first region corresponding to the electrode lead and a second thickness in a second region adjacent to the electrode lead, the second thickness being less than the first thickness; and
a protecting circuit module, the protecting circuit module including a substrate, a temperature control portion, and a connecting tab, the substrate having a first surface mounted on the first region, the first surface of the substrate being spaced apart from the second region, the connecting tab coupling the temperature control portion to the substrate, wherein:
the substrate has a groove therein that completely penetrates the substrate, the temperature control portion having a body that is located in the groove, the groove having a length greater than that of the body such that the body fits within the groove, and
the body in the groove directly contacts the second region of the sealing portion.

2. The battery pack as claimed in claim 1, wherein the temperature control portion includes an extending portion that provides an electrical connection to the body of the temperature control portion, the extending portion extending straight out from a side of the body of the temperature control portion and being electrically connected to the connecting tab.

3. The battery pack as claimed in claim 2, wherein the extending portion is spaced apart from a first surface of the temperature control portion in a thickness direction of the sealing portion.

4. The battery pack as claimed in claim 2, wherein the connecting tab includes a first connecting portion electrically connected to the extending portion, a second connecting portion electrically connected to the substrate of the protecting circuit module, and a bent portion between the first and second connecting portions.

5. The battery pack as claimed in claim 4, wherein the first connecting portion is spaced apart from a first surface of the temperature control portion in a thickness direction of the sealing portion.

6. The battery pack as claimed in claim 4, wherein the first connecting portion is spaced apart from the second region of the sealing portion in a thickness direction of the sealing portion.

7. The battery pack as claimed in claim 4, wherein the first connecting portion has a quadrangular shape, and the bent portion and the second connecting portion extend from at least one side of the first connecting portion.

8. The battery pack as claimed in claim 4, wherein the bent portion offsets the first connecting portion from the second connecting portion in a thickness direction of the sealing portion.

9. The battery pack as claimed in claim 1, wherein the first connecting portion is welded to the extending portion.

10. The battery pack as claimed in claim 1, wherein the temperature control portion includes a first extending portion extending from a first side, and a second extending portion extending from a second side, an overall length of the temperature control portion including the first and second extending portions being less than a length of the groove.

11. The battery pack as claimed in claim 10, wherein respective connecting tabs are provided at the first and second sides of the temperature control portion, the connecting tabs extending between the respective extending portions and edges of the groove.

12. The battery pack as claimed in claim 1, wherein the groove exposes the second region of the sealing portion, such that the substrate is not interposed between the body of the temperature control portion and the second region of the sealing portion in the groove.

13. The battery pack as claimed in claim 1, wherein the first surface of the substrate contacts the first region of the sealing portion.

* * * * *